March 7, 1967 H. R. ROTTMANN 3,307,446
GAUGING WALL THICKNESS OF GLASS TUBING
Filed July 11, 1962 3 Sheets-Sheet 1
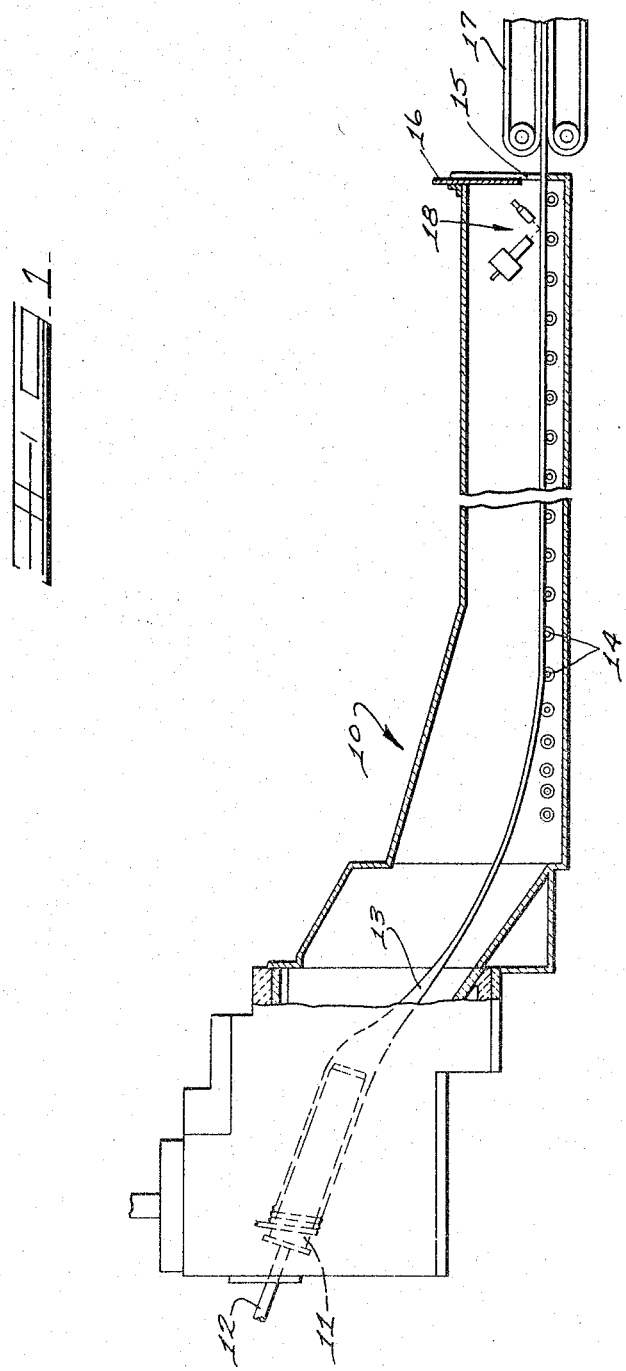
INVENTOR.
HANS R. ROTTMANN March 7, 1967   H. R. ROTTMANN   3,307,446
GAUGING WALL THICKNESS OF GLASS TUBING
Filed July 11, 1962   3 Sheets-Sheet 2
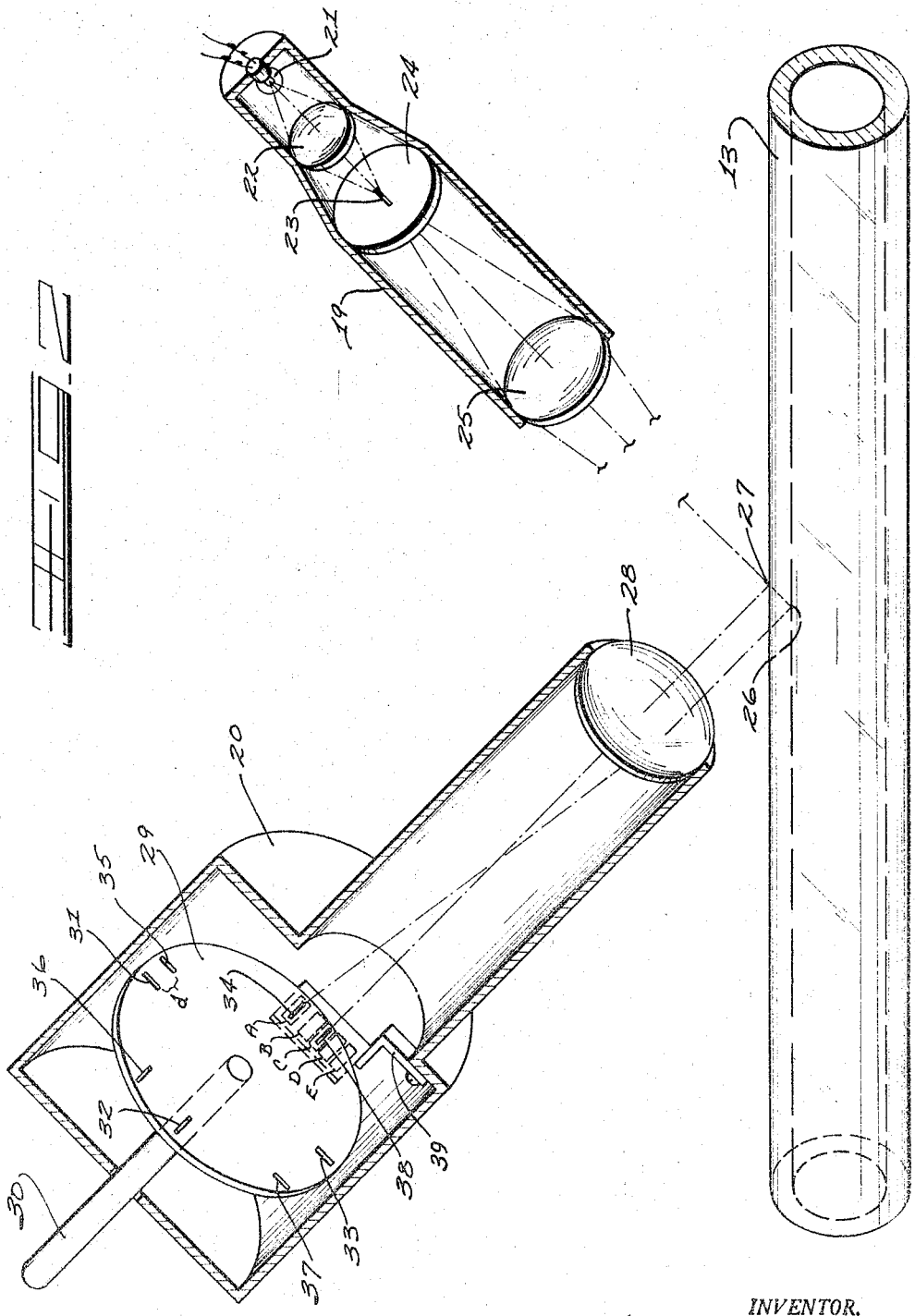
INVENTOR.
HANS R. ROTTMANN
BY
ATTORNEYS March 7, 1967  H. R. ROTTMANN  3,307,446
GAUGING WALL THICKNESS OF GLASS TUBING
Filed July 11, 1962  3 Sheets-Sheet 3
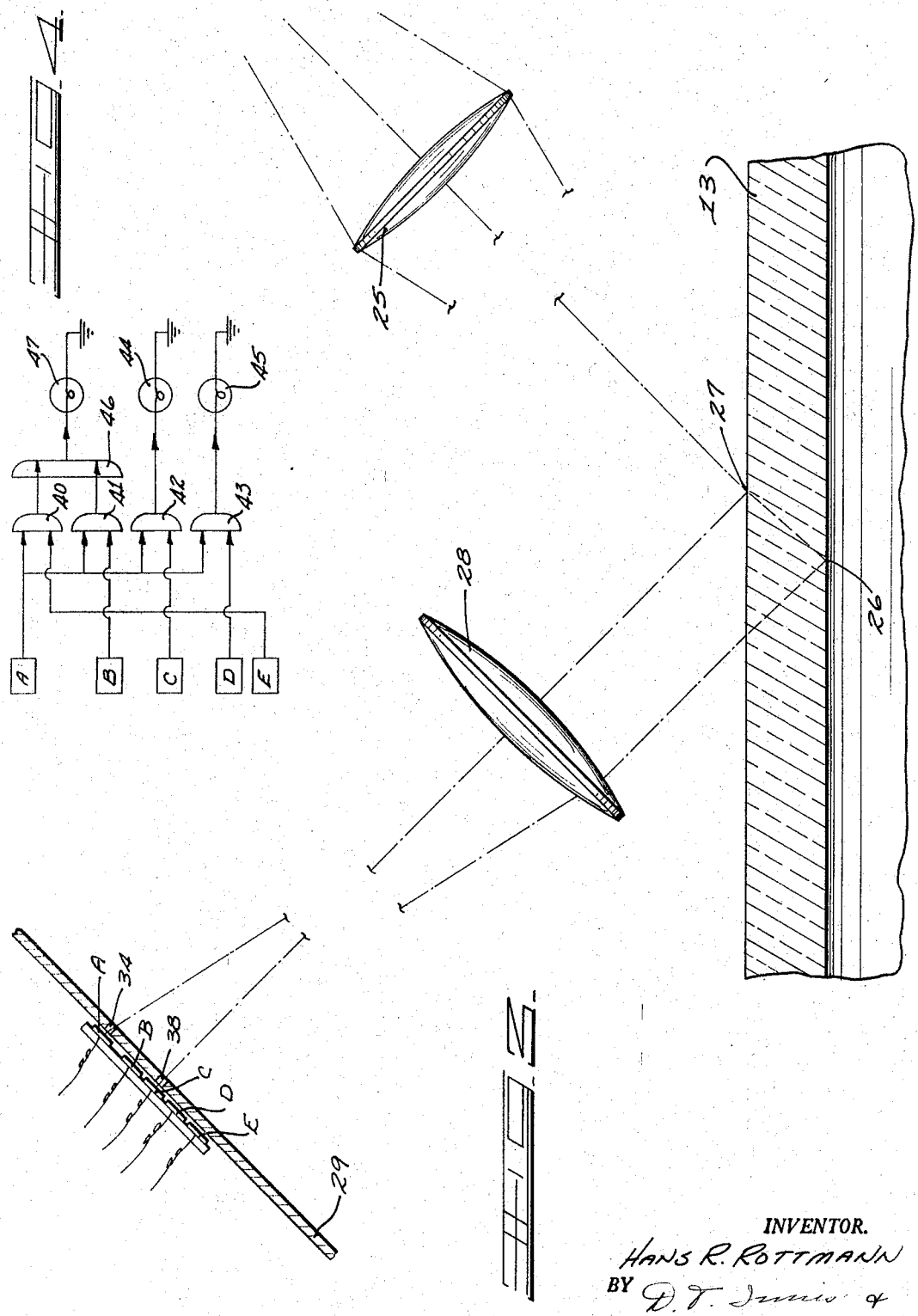
INVENTOR.
HANS R. ROTTMANN
BY
ATTORNEYS

United States Patent Office 3,307,446
Patented Mar. 7, 1967

3,307,446
GAUGING WALL THICKNESS OF GLASS TUBING
Hans R. Rottmann, Toledo, Ohio, assignor to Owens-Illinois, Inc., a corporation of Ohio
Filed July 11, 1962, Ser. No. 209,029
7 Claims. (Cl. 88—14)

This invention relates to a method and apparatus for measuring the wall thickness of glass tubing. More particularly this invention relates to an optical method and apparatus for gauging the wall thickness of glass tubing as the tubing is being drawn in a tubing alley.

It has been the practice in the past to measure the external diameter of the tubing as it is being formed by the use of mechanical feeler gauges and to measure the wall thickness of tubing by determining the absorption rate of an X-ray beam passing diametrically across the entire tubing width. However, the X-ray type of wall thickness gauge necessarily depends upon symmetrical and uniform wall thickness for its accuracy, from the standpoint that the X-ray beam is being absorbed by two walls. Thus, if there is a deviation in the thickness of one wall in one direction with a concurrent deviation in the wall thickness of the opposite wall in an opposite direction, the X-ray gauge will have a constant reading. Thus, actual wall thickness may not be accurately gauged. An example of such prior art apparatus is illustrated in Cooke et al. U.S. Patent No. 2,958,160.

With the foregoing in mind it is an object of this invention to provide a method of optically gauging the wall thickness of tubing as it is being formed in a conventional tubing alley.

It is an additional object of this invention to provide a method of gauging the wall thickness of glass tubing wherein a precise measurement of a single wall of the tubing may be made while the tubing is experiencing vertical vibrations or is "jumping" in the tube alley.

It is an additional object of this invention to provide apparatus for gauging the wall thickness of tubing as it is being formed in a conventional tubing alley.

It is another additional object of this invention to provide an apparatus for gauging wall thickness of glass tubing wherein a precise measurement of a single wall of the tubing may be made while the tubing is experiencing vertical vibrations or is "jumping" in the tube alley.

It is a still further object of this invention to provide a method and apparatus for gauging the wall thickness of glass tubing during its formation with signal means for indicating deviation of the wall thickness from a predetermined value.

Other and further objects will be apparent from the following description taken in conjunction with the annexed sheets of drawings wherein:

FIG. 1 is an elevational view, partly in section, through the length of the tube alley, schematically illustrating the location of the gauging unit;

FIG. 2 is an isometric view, partly in section, illustrating the gauging elements in combination with the section of the tubing to be gauged;

FIG. 3 is a partial sectional elevational view on a somewhat enlarged scale illustrating the optical principles of the invention;

FIG. 4 is a schematic circuit diagram of the electronic gauging and signalling circuit utilized in the invention.

In the usual tube drawing alley the tubing, as it is being drawn along the length of the alley, is controlled as to its size and wall thickness principally by regulating the rate at which the tubing is being drawn. Furthermore, it has been applicant's experience that as the tubing is being drawn, there will be slight vibrations of the tubing in a generally vertical direction. These vibrations are termed "jumps" in the tube forming art.

Referring to FIG. 1, there is shown a schematic view of a tube drawing alley, generally designated 10. The left end of the alley, as viewed in FIG. 1, is the area where the molten glass is fed to a mandrel 11 which is generally tubular in nature and is adapted to be rotated at a relatively constant speed. The lower end of the mandrel 11 is open and fluid under pressure is fed to the interior of the mandrel by supply pipe 12 and serves to form a hollow tubing 13 of relatively plastic glass which is drawn from the end of the mandrel and sags downwardly until contacting the series of rollers 14 which are spaced along the length of the tube alley. The end of the alley toward which the tubing is drawn has an opening 15 therein through which the tubing is drawn. The opening 15 has a vertically adjustable door 16 adapted to close off part of the opening 15 to effectively enclose the tubing during drawing so that the proper temperature may be maintained throughout the length of the tube alley. It should be understood that heat is maintained within the interior of the tube alley 10. The mechanism for drawing the tubing may take the form of a pair of gripping belts 17 driven in any suitable manner. Positioned adjacent the adjustable door 16 and above the path of movement of the tubing is the optical gauging device of the invention, generally designated 18.

The gauging device, shown in greater detail in FIG. 2, generally comprises a pair of tubular housings 19 and 20 with the housing 19 containing a source of illumination 21. The source 21 may be an ordinary incandescent lamp having a glowing filament when energized. Mounted in front of the lamp 21 is a convex lens 22. The lens 22 focuses the filament of the light source onto a slit 23 formed in the center of a disc 24. The slit 23 has a width which is relatively small since the width of the slit will determine the resolution of the gauge. Mounted near the lower end of the housing 19 is a second convex lens 25 which projects a sharp image of the slit 23 onto the tubing 13. While there is shown a single lens 25, it should be kept in mind that a system of lenses may be used in order to provide an extremely sharp image of the slit on the tubing sidewall. The width of the slit 23 must be small enough to insure the formation of distinct images of the slit on both the inner surface 26 and the outer surface 27 of the tubing 13.

As can be seen when viewing FIG. 2, the slit 23 has a substantial length compared to its width and thus the image of the slit which appears on the surfaces 26 and 27 of the tubing 13 will have some length; however, this length will be at right angles to the axis of the tubing 13. The housing 20 which serves as the pick-up unit supports a lens 28 with its axis parallel to and in the zone of light reflected from the surface of the tubing 13. The lens 28 will focus magnified images of the surface areas 26 and 27 onto a disc 29 by reason of the fact that lens 28 has its focal point closer to the tubing surface than lens 25. While there is shown a single lens 28, it should be kept in mind that a system of lenses may be used in order to provide extremely sharp images of the illuminated portions of the surfaces 26 and 27 onto the rotating disc 29. The disc is supported in the housing 20 by a shaft 30 and is adapted to be rotated by rotation of the shaft 30. The speed of rotation of the shaft 30 may be, for example, 3600 r.p.m. The disc 29 has four pairs of slits formed therethrough. One of the slits 31, 32, 33 and 34 of each pair of slits are located radially of the disc at 90° intervals about the circumference of the disc. These slits 31–34 have companion slits 35–38 with each pair of silts being differently spaced. Thus it can be seen that the slits 31 and 35 are spaced apart a distance designated $d$. The slits 34 and 38 are spaced apart a slightly greater distance than the distance $d$. The slits 33 and 37 are spaced apart a distance slightly greater than the spacing of the slits 34 and 38 and the slits 32 and 36 are spaced apart an even greater distance. The relative spacing of the slits is such that, when images of the illuminated portions 26 and 27 of the tubing 13 are focused by the lens 28 on the disc and during a single revolution of the disc, one pair of slits will be simultaneously illuminated. Simultaneous illumination of any pair of slits will be indicated or sensed by a series of photo-sensitive pick-up elements mounted behind the disc 29. These photo-sensitive elements are mounted on a bracket 39 connected to the housing 20 and are designated A, B, C, D, and E. (See FIGS. 3 and 4.) The spacing of elements A and B will be equal to $d$ while the spacing of element A from the elements C, D and E will correspond to the spacing of the slits 34, 38, 33, 37 and 32, 36, respectively.

Thus it can be seen that there are five photo-sensitive elements positioned behind the disc 29 and depending upon the thickness of the wall of the tubing 13, the photo-sensitive element A will be illuminated simultaneously with the illumination of one of the other four photo-sensitive elements B, C, D or E.

With particular reference to FIG. 3 which illustrates the pick-up unit on an enlarged scale, it can be seen that light focused by the lens 25 onto the surface 27 of the tubing 13 will be reflected specularly and be viewed by the lens 28 and focused thereby onto the disc 29. Furthermore, light passing into the tubing wall will be reflected from the inner surface 26 and also be viewed by the lens 28 which in turn will focus this reflected and refracted light onto the disc 29. With the particular orientation of the disc 29, shown in FIG. 3, the light reflected from the surface 26 is illustrated as falling on the photo-sensitive element A and the light reflected from the surface 27 is illustrated as falling on the photo-sensitive element C. Obviously, if the tubing is jumping, the surfaces 26 and 27 will be in vertical vibration. However, during the vertical jumping of the tubing the surface 26 will, at some interval, be located in the position illustrated in FIG. 3 and the light reflected from this surface will illuminate the photo-sensitive pick-up A. The pick-up element A is, in a sense, the reference element as will be obvious from the description of the gauging circuit below. In effect, the photo-sensitive elements will not provide a signal except when the sensitive element A is energized simultaneously with one of the other sensitive elements. In this manner and by reason of the fact that the disc 29 is being rotated at high speed, vertical movement of the tubing in an oscillatory manner will not render the gauge inoperative or permit the gauge to give an erroneous reading. Obviously, more or less than four sensitive elements such as B, C, D, and E may be provided. However, any change in the number of photo-sensitive elements must be accompanied by a change in the number and spacing of the pairs of slits. The spacing corresponds to the spacing between elements A and each of the other four photo-sensitive elements.

As an example of a suitable indicating or signalling system, and with reference to FIG. 4, there is shown a schematic circuit diagram in which the photo-sensitive elements A, B, C, D, and E are connected to transistorized "gate" circuits. The photo-sensitive element A is connected to one of the inputs of four "and" gates 40, 41, 42 and 43. The other input to the "and" gate 40 is from the photo-sensitive element E and the photo-sensitive elements B, C, and D are connected respectively to the other input of "and" gates 41, 42, and 43.

Thus it can be seen that it is necessary for a signal to be received from photo-sensitive element A and one of the other elements in order to have an output signal from any one of the "and" gates. Since photo-sensitive element A is common to all of the "and" gates, it is the energization of this element which provides the reference point for passage of a measuring signal from any of the "and" gates. The two photo-sensitive elements C and D which are physically located between the photo-sensitive elements E and B, are connected to the "and" gates 42 and 43 with the outputs of these "and" gates going to indicator lights 44 and 45. When the tubing is of acceptable wall thickness, the indicator light 44 or 45 will be energized. The particular reason for having two lights is such that the machine operator may be able to distinguish between acceptable wall thickness formation. For example, the light 44 could be yellow and the light 45 green. Thus the operator can be observing the lights, determining which side of the median the wall thickness of the tubing falls on, and observing in which direction a deviation is progressing. The two "and" gates 40 and 41 have their outputs connected to an "or" gate 46 which in turn has its output connected to an indicator light 47. The light 47 may be a red light and will be energized whenever light is sensed by units A and B or the units A and E. The distance between photo-sensitive elements A and B is such that when both elements are energized simultaneously during the operation of the device, the wall thickness of the tubing being gauged will be too thin. When the photo-sensitive elements A and E are simultaneously energized during the operation of the gauging device, the wall thickness of the tubing will be too great. In either of these situations the indicator light 47 will be energized, thus providing the operator with a signal indicative of the formation of tubing which is outside the preset limits. By observing the lights 44 and 45, the operator is kept informed of whether the tubing is being formed acceptably and also in which direction a possible later non-acceptable reading will fall.

Obviously, a greater or lesser number of photo-sensitive pick-ups could be used depending upon the degree of sensitivity desired, and the spacing between the photo-sensitive elements on the bracket 39 is selective to the extent that the sensitivity of the device will permit gauging of wall thicknesses of various tubing.

An example of a suitable "and" gate for any of the four "and" gates may be those designated T–404 and are germanium transistor plug-in elements manufactured by Engineered Electronics Co., Santa Ana, California and described in their catalog #859, Revision B, dated January 1, 1961. A suitable "or" gate 46 is described in the above-referred-to catalog under the designation T–406.

An example of a suitable indicator light may also be found in the above-referred-to catalog and are supplied under the designation R–341. It should be understood that the above-referred-to elements and components making up the circuit may be structurally different than those described above; however, it is advantageous to use a simple transistorized circuit requiring low power and these plug-in units have proved of distinct advantage in their ease of servicing.

Various modifications may be resorted to within the spirit and scope of the appended claims.

I claim:

1. The method of gauging the wall thickness of glass tubing during the continuous formation thereof comprising the steps of directing a narrow beam of light against the outside of said tubing in the plane of and at an oblique angle to the axis of said tubing, focusing the light reflected from the inner and outer surfaces of said tubing onto a rotating disc having a plurality of pairs of unequally spaced slits therein, rotating said disc, and indicating which pair of slits correspond to the relative displacement of said reflections as an index of the wall thickness of said tubing.

2. The method of gauging the wall thickness of glass tubing during the formation thereof comprising the steps of directing a narrow beam of incident light at an oblique angle against the surface of said tubing in the plane of movement of the tubing, a first portion of the light being reflected from the outer surface of the tubing, a second portion of the light penetrating the outer surface and being reflected from the inner surface, focusing the reflected light from both the outer and inner surfaces of the tubing in a common plane, rotating a disc having unequally spaced pairs of openings therethrough in said plane, and determining which pair of openings are simultaneously illuminated by said reflected light as an indication of the tubing wall thickness.

3. The method of gauging the wall thickness of glass tubing during the continuous formation thereof comprising, illuminating a narrow slit in a plate, projecting an image of said slit onto the outer surface of said tubing in the form of a narrow strip of light generally directed toward the axis of said tubing but at an oblique angle thereto, such that a first portion of said light will be reflected from the outer surface of said tubing and a second portion of said light will be reflected from the adjacent inner surface of said tubing, magnifying and focusing both reflections onto the surface of a rotating plate having plural pairs of unequally spaced openings therethrough, rotating said plate so as to successively bring said pairs of openings into the field of illumination of said focused reflections and indicating which pair of openings are simultaneously illuminated as an index of wall thickness of said tubing.

4. Apparatus for gauging the wall thickness of tubing in a tube drawing alley comprising a source of light, means for projecting a narrow beam of light from said source against the side wall of said tubing, said beam approaching the tubing at an oblique angle from above and having its narrow dimension normal to the axis of said tubing, means for viewing reflections from said tubing inner and outer surfaces which are coplanar with the incident beam; said viewing means comprising a condensing lens, a plurality of spaced-apart photo-sensitive elements positioned at the image point of a reflection from said tubing wall when said wall is in a predetermined position, a disc positioned in front of said elements with its edge overlying said elements, a plurality of unequally spaced pairs of slots formed in the edge portion of said disc, and means connected to said disc for rotating said disc for moving said pairs of slots successively in front of said elements.

5. Apparatus for gauging the wall thickness of tubing in a tube drawing alley comprising a member having a slit therein, means illuminating said slit, an optical condensing system mounted in front of said member, the axis of said slit and system being directed toward the axis of the tubing being drawn and at an oblique angle thereto, a second optical condensing system having its axis 90° displaced from the axis of the system and slit and coplanar with said axis and the axis of said tubing, a disc mounted adjacent the focal point of said second system and having a plurality of pairs of precisely placed slits formed therein at spaced intervals, a plurality of spaced photo-sensitive elements mounted in back of said disc, in the path of travel of the slits in said disc, means for rotating said disc about an axis displaced from, but parallel to, the axis of said second system, and means connected to said photo-sensitive elements for indicating the simultaneous illumination of a pair of slits.

6. Apparatus for gauging the wall thickness of tubing in a tube drawing alley comprising a source of illumination, a member having a slit therein, means mounting said member in front of said source to illuminate said slit, an optical condensing system mounted in front of said member, the axis of said source, slit and system being directed toward the axis of the tubing being drawn and at an oblique angle thereto, a second optical condensing system having its axis 90° displaced from the axis of the source and slit and coplanar with said axis and the axis of said tubing, a disc mounted adjacent the focal point of said second system, said disc having a plurality of pairs of slits formed therein at varying spaced-apart relationship, a plurality of photo-sensitive elements mounted in back of said disc, in the path of travel of the slits in said disc, means mounting said disc for rotation about an axis displaced from, but parallel to, the axis of said second system, whereby reflected light from the tubing wall will be focused on the disc adjacent its periphery, and means for indicating the simultaneous illumination of a pair of slits as an indication of the relative wall thickness of said tubing.

7. Apparatus for gauging the wall thickness of tubing in a tube drawing alley comprising a source of light, means positioned in front of said light source for directing a narrow beam against the side wall of said tubing, said beam approaching the tubing at an oblique angle from above and having its narrow dimension normal to the axis of said tubing, means for viewing reflections from said tubing inner and outer surfaces which are coplanar with the incident beam; said viewing means comprising a condensing lens, a first photo-sensitive element positioned slightly beyond the image point of a reflection from one surface of said tubing, a plurality of spaced-apart photo-sensitive elements positioned slightly beyond the image point of a reflection from the other surface of said tubing wall, and means connected to said elements for indicating the simultaneous illumination of said first photo-sensitive element with one of said plurality of photo-sensitive elements by light reflected from said tubing surfaces.

References Cited by the Examiner

UNITED STATES PATENTS

| | | | |
|---|---|---|---|
| 1,756,785 | 4/1930 | Gallasch | 88—14 |
| 1,875,665 | 9/1932 | Schweizer | 88—14 |
| 2,433,557 | 12/1947 | Hurley | 88—14 |
| 3,117,266 | 1/1964 | Raymond | 250—220 |

DAVID H. RUBIN, *Primary Examiner.*

JEWELL H. PEDERSEN, *Examiner.*

T. L. HUDSON, A. A. KASHINSKI,
*Assistant Examiners.*